United States Patent [19]
Johnson

[11] 3,774,510
[45] Nov. 27, 1973

[54] UNITARY TRIM CONTROL

[75] Inventor: Bruce K. Johnson, Andover, Mass.

[73] Assignee: Polaroid Corporation, Cambridge, Mass.

[22] Filed: July 21, 1971

[21] Appl. No.: 164,772

[52] U.S. Cl. .................. 95/11 R, 95/10 C, 95/11 L, 240/1.3, 95/11.5 R
[51] Int. Cl. ......................... G03b 15/03, G03b 3/04
[58] Field of Search ....................... 95/45, 44, 11 R, 95/11 L, 11.5 R, 10 C, 55, 56; 240/1.3, 46.01, 46.03, 46.05, 46.07, 46.09, 46.27, 46.45

[56] References Cited
UNITED STATES PATENTS

| 3,283,681 | 11/1966 | Singer et al. | 95/11.5 R X |
| 3,296,947 | 1/1967 | Engelsmann et al. | 95/11.5 R X |
| 3,538,825 | 11/1970 | Taylor | 95/11 R |
| 2,378,207 | 6/1945 | Fuller | 95/56 |
| 3,456,101 | 7/1969 | Rentschler et al. | 240/1.3 |
| 3,072,029 | 1/1963 | Leitz | 95/10 C |
| 3,616,731 | 11/1971 | Rentschler | 95/10 CD |
| 3,491,667 | 1/1970 | Land | 95/11 R |

FOREIGN PATENTS OR APPLICATIONS

| 1,288,421 | 1/1969 | Germany | 95/55 |

Primary Examiner—Robert P. Greiner
Attorney—Charles Mikulka et al.

[57] ABSTRACT

The subject disclosure describes an exposure control system which is automatically adjusted in conformance with the distance settings of a camera with which it is incorporated to provide so-called "follow-focus" operation. The exposure control system operates in both ambient and "flash" modes and is provided with a unitary manually-operable "trim" mechanism such that a camera operator need only insert one trim setting for either ambient or "flash" mode operation. The unitary "trim" mechanism cooperates with a first mechanism that is effective to control illumination received from a subject when operating in an ambient mode and simultaneously cooperates with a second mechanism which is solely effective in controlling the illumination received from a subject when operating in a "flash" mode.

The first mechanism includes a variable density filter which is movably positioned with respect to a photosensitive element (positioned to receive illumination from a subject) whereby illumination reaching the photosensitive element from said subject may be varied to alter exposure interval.

The second mechanism includes cam means for selectively altering an aperture effective to control the illumination reaching a film plane.

34 Claims, 7 Drawing Figures

INVENTOR.
BRUCE K. JOHNSON
BY Brown and Mikulka
and
Michael Bard
ATTORNEYS

INVENTOR.
BRUCE K. JOHNSON

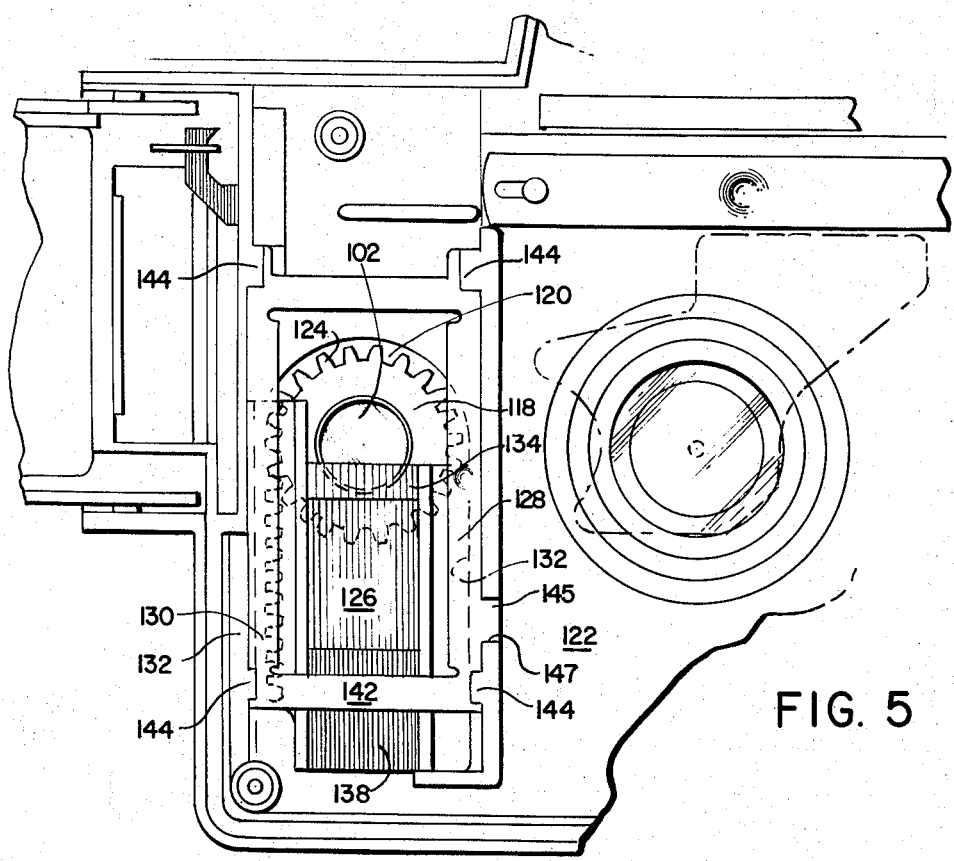
FIG. 5
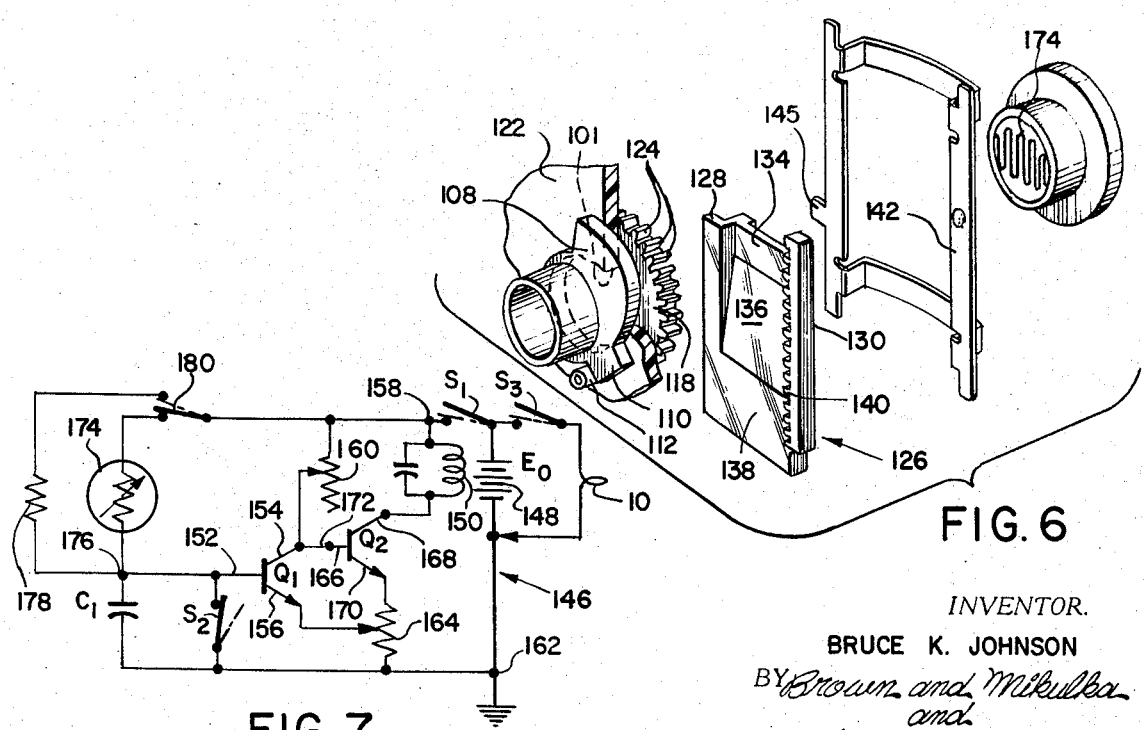
FIG. 6
FIG. 7
INVENTOR.
BRUCE K. JOHNSON
BY Brown and Mikulka
and
Michael Bard
ATTORNEYS

UNITARY TRIM CONTROL

BACKGROUND OF THE INVENTION

This application is a continuation-in-part of my earlier application Ser. No. 101,336, filed Dec. 24, 1970, and entitled "Range Responsive Flash Unit", now U.S. Pat. No. 3,731,822.

Many prior art exposure control systems have been developed that are responsive to light from a scene being photographed for causing the exposure interval to be functionally related to the level of scene brightness.

Typical of such systems is one incorporating shutter operator means actuable to cause the shutter means of the camera to initiate exposure, and deactuable to cause it to terminate exposure, so that the exposure interval is essentially the time that said shutter operator means is actuated. To control this time, a control means is provided having shutter timing apparatus including a voltage-sensitive trigger circuit for actuating and deactuating the shutter operator means; and an R-C network, the resistance of which is constituted by a photosensitive element whose resistance is functionally related to the level of brightness of a scene to which the element is exposed. When the R-C network is activated, substantially at the same time the trigger circuit actuates the shutter operator means, it generates a trigger voltage in a period of time dependent upon the capacitance of the network and the resistance of the element as established by the level of scene brightness. The voltage-sensitive trigger circuit is responsive to the voltage generated by the R-C network for deactuating said shutter operator means when the voltage reaches the trigger voltage, so that the actual exposure time (as established by the time that the shutter operator means is actuated) is essentially the time required by the R-C network, after activation, to generate the trigger voltage.

To improve the results obtainable with such a system under conditions of transient as well as steady-state illumination, it has been found advisable to provide a variable density filter that is movably mounted relative to the photosensitive element. This expedient provides a "trim" arrangement by which the exposure error curves can be modified slightly to match a particular situation.

For example, where a dark subject is to be photographed against a light background, the brightness to which the element will respond would be the average brightness of the scene as a whole, rather than the particular brightness of the subject. Generally, underexposure of the subject will result. To preclude this, the variable density filter may be interposed between the subject and the photoconductive element to reduce the average scene brightness to a value that permits correct exposure of the subject.

It has been found, however, that less than satisfactory exposures frequently result when the subject is indoors and is illuminated with a flash lamp, and that improved and more consistent results are obtainable by setting the shutter to produce an exposure of a predetermined interval long enough (e.g., 1/30 of a second) to take full advantage of the light output of a conventional flash lamp in controlling the light energy reaching the film by another means.

It should be readily apparent that in a system incorporating a predetermined fixed exposure interval (when operating in a "flash" mode) a variable density filter utilized as aforesaid will have no effect on exposure. Accordingly, the capability for "trimming" exposure to suit various physical conditions will be lost when operating in the "flash" mode.

In another type of exposure control system, a plurality of adjustable louvers are disposed across the face of a flash lamp and serve to control the amount and direction of light emitted according to their rotational positions. The louvers are actuated by means of a cam and lever system operatively connected to the focus control of the camera whereby adjusting the focus control effects predetermined rotation of the louvers to vary the passage of light therebetween and provide an essentially correct illumination at any of a plurality of distance settings.

A cooperating trim mechanism functions to enable an overall shift in the rotational position of the louvers to alter the illumination at any given focus setting as may be desired. Thus, for example, a setting may be modified by the trim mechanism to voluntarily alter the exposure, e.g., to accommodate some known peculiarity of film sensitivity; to satisfy a preference for a darker or lighter print; to enable a slight increase of illumination range; or for some other reason. Such a prior art system is described in copending application, Ser. No. 56,079, filed June 29, 1970 (Case No. 4157) and commonly assigned herewith. In this type of system, however, the trim control is not effective when operating in an ambient mode and without the addition of a second trim control means, the capability for "trimming" exposure will be lost (when operating in the ambient mode).

Clearly, it is desirable to provide a "trim" function to accommodate for slight variations in the sensitometric characteristics of the film as well as to insert a modicum of personal or overriding control over the automated exposure control system. Ideally, such trim control should be provided with only one manually adjusted component. Should a dual trim system for flash and ambient modes be provided having more than one control element, a camera operator may become confused or overlook a requirement for providing a trim control for that mode of operation which he is currently using. Additionally, it is desirous that any follow-focus system, within a dual parameter exposure regulation arrangement, be amenable to relatively simple factory calibration.

In view of the foregoing, it is an object of the present invention to provide a follow-focus, or range-responsive, exposure control system incorporating a unitary manual trim feature which is operative in correspondence with the trim function of a dual parameter, light-responsive exposure control circuit.

Another object of the present invention is to provide, in conjunction with a photographic camera employing an automatic exposure control system, unitary means for selectively altering the exposure parameters in either ambient or "flash" mode operation.

Yet another object of the instant invention is to provide photoflash lamp modulation means for use with a focusable camera, and incorporating means for selectively and uniformly illuminating a subject as a function of the focus setting of the camera and unitary means for selectively altering the illumination received from said subject independent of said focus setting and simultaneously operable to alter the illumination received from said subject when operating said camera in an ambient mode.

It is a further object of the subject invention to provide, in combination with a camera having a dual parameter exposure control system, a first trim control mechanism operable to alter one of said dual parameters, a second trim control mechanism operable to selectively alter the other of said dual parameters, and unitary means for controlling both of said first and second mechanisms.

It is still a further object of the present invention to provide a unitary trim control for use with a camera of the type operable in both "flash" and ambient modes (and employing an automatic exposure control system which functions in response to range when operating in a "flash" mode and in response to scene brightness when operating in an ambient mode) wherein said trim control includes unitary means for simultaneously selectively altering the illumination reaching the film plane of said camera independent of scene brightness.

SUMMARY OF THE INVENTION

The subject invention provides a unitary trim control means for manually adjusting the response of an automatic exposure control system. The unitary trim control means is capable of selectively altering the exposure irrespective of the functioning mode of the camera, e.g., "flash" or ambient operation. Thus, selective adjustment of the exposure variables operable when functioning in a "flash" mode will automatically effect adjustment of the exposure variables operating when functioning in an ambient mode.

In one embodiment of the subject invention, a flash unit is provided integral with a photographic camera of the type illustrated in copending application, Ser. No. 41,681, filed May 25, 1970, by David E. VanAllen, (Case No. 4127) and commonly assigned herewith.

Such a photographic camera contemplates apparatus usable in flash photography for releasably mounting a multi-lamp photoflash unit or flashcube thereon. The apparatus is mounted on the camera for rotation relative thereto and is engageable with a flashcube unit for rotatably connecting the unit to a camera. The rotation of the apparatus sequentially positions each lamp of the flashcube in a predetermined location for ignition in timed relationship with the exposure producing operation of the photographic camera.

In the embodiment of the subject invention envisioned for use with such a photographic camera, cover means is provided which is pivotally secured to the camera housing so as to be foldable over the flashcube mounting means when no flashcube is secured thereby and erectable to a position so as to provide a predetermined aperture through which light from the flashcube must pass in reaching a subject.

The cover means includes a plurality of generally rectangular telescoping apertured plates which are adapted to be sequentially advanced (so as to either increase or decrease the net aperture) by a cam and linkage assembly which is designed to effect a predetermined advance of said apertured plates as a function of the focus setting of said camera.

Each of the telescoping apertured plates includes plural apertures such that their sequential advancement will effect a change in the illumination reaching the central portion of the subject, as well as the size of the net aperture, and eliminate vignetting. Furthermore, one of the telescoping apertured plates is provided with tab means extending through the apertures in each of the other telescoping plates whereby illumination provided from the flash device to the subject will be uniformly distributed.

The subject invention envisions novel trim control means which includes a unitary control member which is coupled to one of said apertured plates via a cam and linkage assembly and connected to a variable density filter which may be selectively positioned with respect to a photosensitive element.

When operating in a "flash" mode, adjustment of the unitary control means will provide a predetermined advance to said apertured plates, independent of the focus setting of the camera, and at the same time selectively modulate the light reaching the photosensitive element. When operating in the "flash" mode, the photosensitive element does not affect the exposure control settings and, hence, the variable density filter will have no effect on such settings. However, when the camera is operated in an ambient mode, the exposure control settings are determined by the illumination reaching the photosensitive element and, hence, the selective movement of the variable density filter (which was effected in the "flash" mode) will provide a predetermined adjustment of the exposure settings when operating in an ambient mode.

DESCRIPTION OF THE DRAWINGS

Other objects and many of the attendant advantages of the present invention will be better appreciated and said invention will become clearly understood with reference to the following detailed description when considered in conjunction with the accompanying drawings illustrating one embodiment of the instant invention, wherein:

FIG. 4 provides a fragmentary top plan of the apertured plates of FIGS. 1 – 3 partly in section and depicting the relationship between the apertured plates in a fully closed position;

FIG. 5 provides a rear elevation of a portion of the novel trim mechanism of the subject invention as seen from inside the camera of FIGS. 1 and 3;

FIG. 6 provides an exploded perspective of a portion of the subject trim mechanism illustrated in FIGS. 1, 3, and 5; and FIG. 7 provides a simplified schematic circuit diagram of a photoresponsive timing circuit adapted for use with the shutter of the camera.

DETAILED DESCRIPTION OF THE INVENTION

Figure 1:
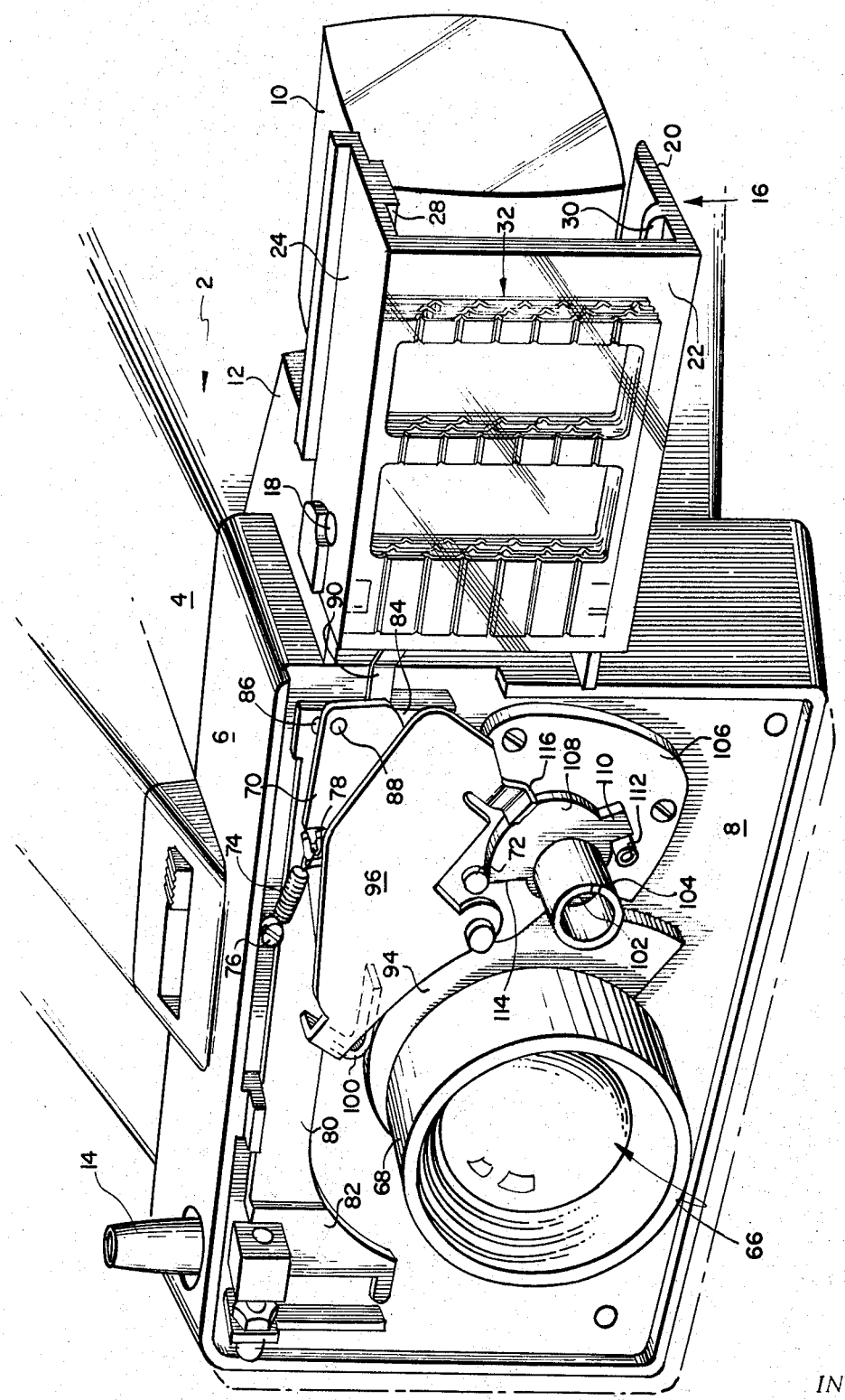
FIG. 1 provides a fragmentary perspective illustrating a portion of the subject invention operatively secured to a photographic camera so as to be operable to selectively alter exposure when operating in a "flash" mode.

Referring to the drawings in more detail and, more particularly to FIG. 1, a non-folding boxtype camera is shown generally at 2 including a body portion 4 which extends to a lens and shutter assembly housing 6 having an inner front wall 8.

A flashcube 10 is operatively and releasably secured to the camera 2 via a flashcube mounting assembly 12 which is of a type commonly employed in the art, such as the mounting assembly illustrated in U.S. Pat. Application, Ser. No. 41,681, aforesaid. The flashcube mounting assembly 12 is itself secured to the lens and shutter assembly housing 6 of the camera 2 and, in a manner employed in the prior art, the flashcube 10 may be fired upon actuation of the camera shutter as by a shutter release button 14.

Figure 3:
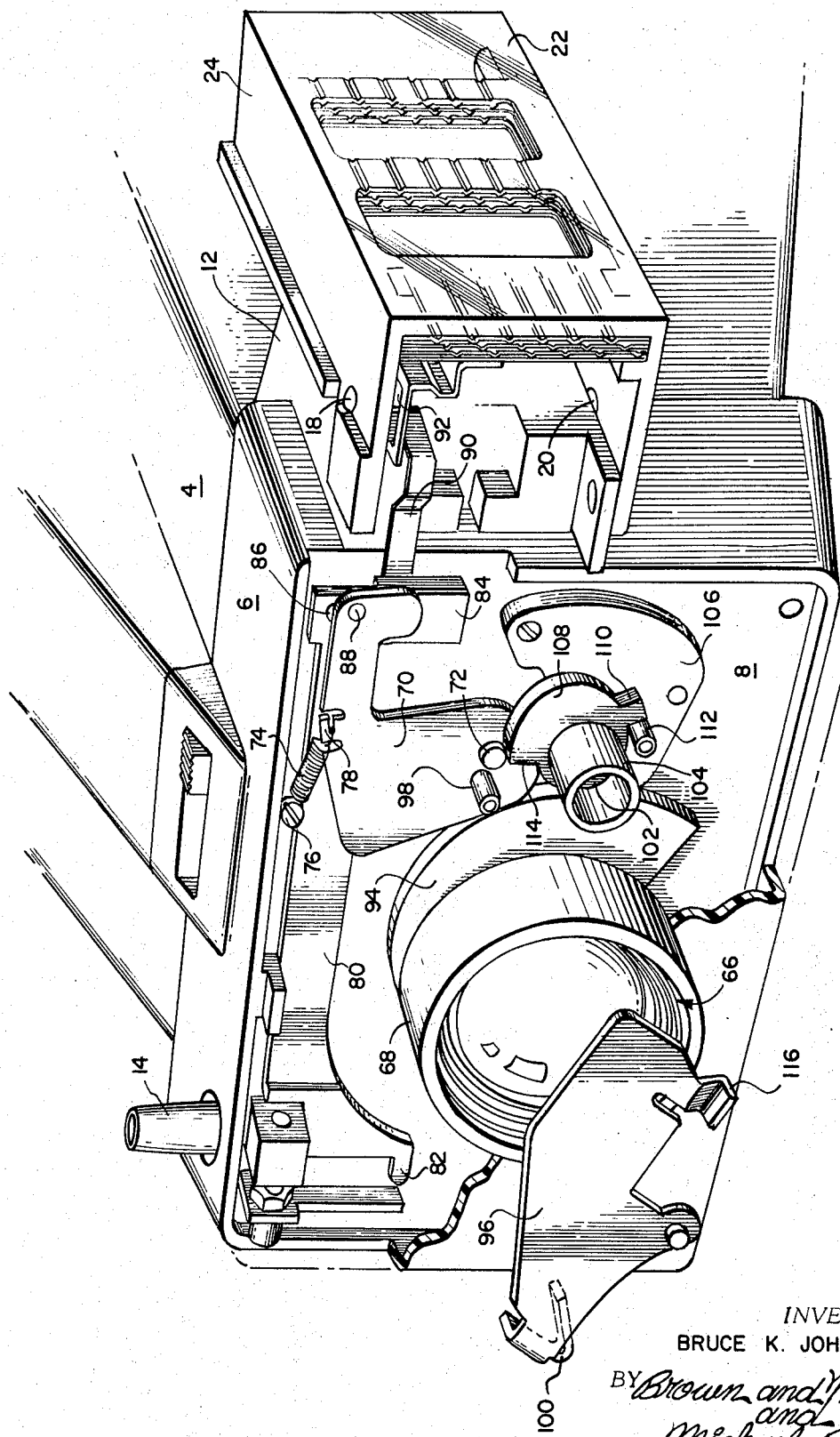
FIG. 3 provides a fragmentary perspective of the device of FIG. 1 showing the unitary trim control means and the exposure control system in more detail.

A generally U-shape foldaway cover assembly 16 is pivotally secured to the flashcube mounting assembly 12 as by pins 18 and 20 (FIG. 3). The foldaway cover assembly 16 is typically formed of transparent plastic and includes a generally rectangular portion 22 and a pair of spaced, parallel top and bottom portions 24 and 26, respectively, extending normally therefrom. The inner surfaces of said top and bottom portions 24 and 26 are so configured that, in conjunction with the inner surface of the front portion 22, they define a pair of longitudinally extending, spaced, parallel slots 28 and 30, respectively.

An array of apertured plates 32 is disposed within the slots 28 and 30 adjacent the inner face of the front portion 22 of the foldaway cover assembly 16. The individual apertured plates of the array 32 are arranged in overlying relationship so as to be slideable with respect to each other within said slots 28 and 30.

It should be noted at this point that the number of apertured plates may be varied to suit any particular requirements and for purposes of illustration, each of the embodiments of the novel follow-focus photoflash lamp modulator herein disclosed will be described for an array comprising four apertured plates.

Figure 2:
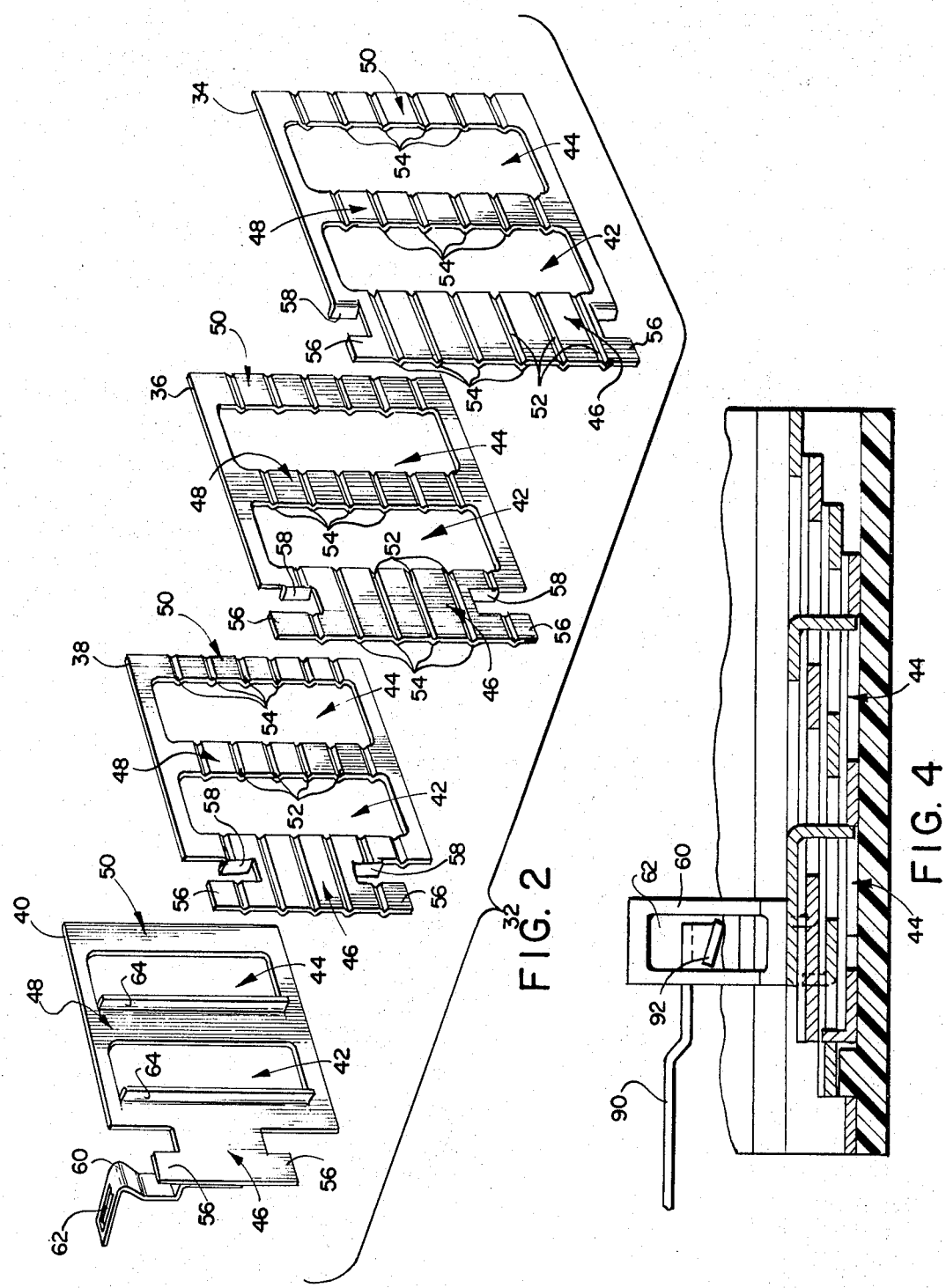
FIG. 2 provides a simplified exploded perspective of a portion of the exposure control system effective when operating in a "flash" mode.

As best seen in FIG. 2, the array 32 is seen to comprise a forwardmost apertured plate 34 which is, as best seen in FIGS. 1, 3, and 4, fixedly disposed within the slots 28 and 30 (immediately adjacent the inner face of the front portion 22 of the foldaway cover assembly 16). A second apertured plate 36 is positioned behind the apertured plate 34 and is slideable with respect thereto. Similarly, a third apertured plate 38 is slideably disposed within the slots 28 and 30 behind the apertured plate 36, and a fourth apertured plate 40 is slideably disposed within the slots 28 and 30 behind the apertured plate 38.

Each of the apertured plates 34, 36, 38, and 40 is provided with a pair of spaced, parallel, generally rectangular apertures 42 and 44, with each and every pair of apertures 42 and 44 being congruent. The apertures 42 and 44 are disposed within each of the apertured plates 34, 36, 38, and 40 so as to define an inner edge portion 46, a central portion 48, and an outer edge portion 50.

Looking more closely to the apertured plate 34 of FIG. 2, it is seen that a plurality of longitudinally directed, spaced, parallel indentations are formed in the forwardly directed surface of the inner and outer edge portions 46 and 50 and the central portion 48 thereof. The indentations 52 on the inner and outer edge portions 46 and 50, respectively, and the central portion 48 of the apertured plate 34 are aligned and are sufficiently deep whereby they appear on the rearwardly directed surface of said portions 46, 48, and 50 as ridges 54.

In a like manner, similar indentations 52 and ridges 54 are formed on the forward and rearwardly directed surfaces, respectively, of the portions 46, 48, and 50 of the apertured plate 36 with the indentations 52 and the ridges 54 of said apertured plate 36 being arranged to extend between the indentations 52 and the ridges 54 of the apertured plate 34. Similarly, the apertured plate 38 is provided with indentations 52 and ridges 54 on the forward and rearwardly directed surfaces, respectively, of the portions 46, 48, and 50 thereof.

The indentations 52 and the ridges 54 of the apertured plate 38 are disposed to extend between the indentations 52 and the ridges 54 of the apertured plate 36. The ridges 54 function to maintain the apertured plates 34, 36, 38, and 40 in predetermined, spaced relation whilst minimizing friction (so as to enable them to slide longitudinally relative to one another). Obviously, the rearwardmost plate 40, not supporting a succeeding apertured plate, need not be provided with indentations 52 and ridges 54, as aforesaid.

It should be emphasized at this point that each of the apertured plates 34 – 40 is constructed of opaque material and that the width of the inner edge portion 46, the central portion 48, and the outer edge portion 50 in the direction of the indentations 52 is the same for each of the apertured plates 34 – 40.

The inner edge portion 46 of each of the plates 34, 36, 38, and 40 is provided with a pair of symmetrically positioned, oppositely directed, upper and lower tabs 56. Also, each of the apertured plates 34, 36, and 38 is provided with a pair of symmetrically disposed, inwardly directed, upper and lower tabs 58 on its inner edge portion 46. It should be noted that the vertical positioning of each of the inwardly directed tab portions 58 on the respective inner edge portions 46, of the apertured plates 34, 36, and 38, are staggered whereby when said apertured plates 34, 36, and 38 are disposed in overlying relationship, their respective tab portions 58 will not interfere with one another. Additionally, the oppositely directed tab portions 56 of each of the apertured plates 34 – 40 are so vertically positioned, on their respective inner edge portions 46, whereby relative movement of the apertured plate 40 outward of the lens and shutter assembly housing 6 will cause its oppositely directed tab portions 56 to engage the inwardly directed tab portions 58 of the apertured plate 38.

Further movement of the apertured plate 40 (outward of said housing 6) will cause the apertured plate 38 to move outward of the lens and shutter housing assembly 6 until its oppositely directed tab portions 56 engage the inwardly directed portions 58 of the apertured plate 36.

It will be recalled that the apertured plate 34 is fixedly secured within the foldaway cover assembly 16 and, therefore, no further relative movements of the apertured plates 40, 38, and 36 outward of the lens and shutter assembly housing 6 will be possible after the tab portions 56 of the apertured plate 38 engage the portions 58 of the plate 36.

It should be further noted that the distance between the oppositely directed tab portions 56 and the inwardly directed tab portions 58 for the apertured plates 34, 36, and 38, and the location of the outwardly directed tab portions 56 on the inner edge portion 46 of the apertured plate 40 (which is not provided with inwardly directed tab portions 58) are precisely predetermined such that when said apertured plate 40 is at its first position, outward of the lens and shutter assembly housing 6, the apertures 42 and 44 of the apertured plate 34 will be completely cut by the opaque portions of the apertured plates 36, 38, and 40.

As best seen in FIGS. 2, 3, and 4, the apertured plate 40 is provided with a rearwardly extending connecting tab 60 affixed to the rearward surface to the inner edge portion 46. The connecting tab 60 is provided with a generally rectangular opening 62 extending therethrough for connection with a cam and linkage assembly to be described in more detail, infra.

The apertured plate 40 is further provided with a pair of forwardly directed tabs 64 extending the entire length of the longitudinal edges of the apertures 42 and 44, respectively, closest to the inner edge portion 46. The tabs 64 extend forwardly of the apertured plate 40 an amount sufficient to extend through the apertures 42 and 44 of the apertured plates 38, 36, and 34 when all of the said apertured plates 34, 36, 38, and 40 are positioned in overlying relationship (within the slots 28 and 30 of the foldaway cover assembly 16). Whilst the forwardly directed tabs 64 extend through the apertured plates 38, 36, and 34, they do not extend beyond the forwardmost face of the apertured plate 34.

Inasmuch as the apertured plates 34 – 40 are disposed in overlying relationship, the edges of the respective apertured plates defining the net aperture through which light from the flashcube 10 may be transmitted to a subject will lie in different planes. Hence, the illumination will not be uniform across the subject, effecting a degradation in the quality of the photographic image reproduction. However, the forwardly directed tabs 64 minimize the effect of the apertured plates 34 – 40 lying in different planes and serve to greatly improve the uniformity of the illumination of the subject by the flashcube 10.

As best seen in FIGS. 1 and 3, the camera 2 is provided with a lens assembly 66 rotatably secured to the inner front wall 8. The lens assembly 66 includes a focusing ring 68 which is rotatably secured to the inner front wall 8, whereby the lens assembly 66 may be focused by rotation of the focusing ring 68.

A lever arm 70 is pivotally secured at one end to the inner front wall 8 of the lens and shutter assembly housing 6, as by a pin assembly 72. A spring 74 is connected to the inner front wall 8, as by screw means 76, and is secured to the lever arm 70 at a position 78 remote from said pin assembly 72. The spring 74 is preloaded so as to bias said lever arm 70 counterclockwise about the pin assembly 72.

An arm 80 is secured to the upper portion of the inner front wall 8 of the lens and shutter assembly housing 6 in a well-known manner whereby said arm 80 may slide linearly across said front wall 8. The arm 80 extends across the front wall 8 of the housing 6 and terminates in an end portion 82 at one end and extends toward said flashcube mounting assembly 12 to terminate in an end portion 84 at its other end. The end portion 84 is provided with a linearly, upwardly extending slot 86 and the lever arm 70 is pivotally connected to the arm 80 by means of a pin assembly 88 which is pivotally and slideably secured to the arm 80 within the slot 86 in the end portion 84.

Thus, pivotal movement of the lever arm 70 about the pin assembly 72 will cause the pin assembly 88 to linearly traverse the slot 86 whilst linearly driving the arm 80 across the inner front wall of the lens and shutter assembly housing 6 in a direction depending upon the direction of pivotal movement of the lever arm 70.

A connecting link 90 is connected at one end to the end portion 84 of the arm 80 and extends outwardly thereof to a bent tab portion 92 which is received within the opening 62 in the rearwardly extending connecting tab 60. The bent tab portion 92 is of suitable size and shape such that it will engage the connecting tab 60 and cause the apertured plate 40 to be moved within the slots 28 and 30 toward the end of said cover assembly 16 closest to the pins 18 and 20 when said foldaway cover assembly 16 is in its folded position (as best seen in FIG. 3). With the cover assembly 16 erected (as best seen in FIG. 1), the bent tab portion 92 will engage the connecting tab 60 such that pivotal movement of the lever arm 70 about the pin assembly 72 will effect linear movement of the arm 80 and, hence, the apertured plate 40 so as to sequentially actuate the apertured plates 38, 36, and 34.

A profile cam 94 of precisely predetermined shape is secured to the periphery of the focusing ring 68 so as to be rotatable therewith. A cam follower 96 is pivotally secured to the lever arm 70 at a position eccentric of the pin assembly 72, as by a pin assembly 98. The cam follower 96 includes an end portion 100 suitably configured to ride upon and follow the peripheral surface of the profile cam 94. The end portion 100 is biased into engagement with the peripheral surface of the profile cam 94 by the spring 74 which biases the lever arm 70 in a counterclockwise direction about the pin assembly 72 while the arm 70, in turn, biases the cam follower 96 counterclockwise about the pin assembly 72 by virtue of its pivotal connection to the pin assembly 98 eccentric of the pin assembly 72.

In operation, focusing the lens assembly 66 will be effected by rotation of the focusing ring 68 carrying therewith the profile cam 94 which, in turn, will cause the cam follower 96 to rotate the pin assembly 98 and, hence, the lever arm 70 about the pin assembly 72. Rotation of the lever arm 70 about the pin assembly 72 will cause the pin assembly 88 to simultaneously move upward within the slot 86 and move the arm 80 toward the flashcube mounting assembly 12.

Such movement of the arm 80 will cause the connecting link 90 to move outward of the housing assembly 6, and with the foldaway cover assembly 16 in its erected position, the connecting link 90 will advance the apertured plate 40, via the connecting tab 60 thereof (which is in engagement with the bent tab portion 92 of said connecting arm 90).

As the apertured plate 40 is advanced, the oppositely directed tabs 56 thereof will engage the inwardly directed tabs 58 of the plate 38. In a similar manner, further advancement of the plate 40 will cause the oppositely directed tabs 56 of the apertured plate 38 to engage the inwardly directed tabs 58 of the apertured plate 36, and such advance of the apertured plates will continue until the oppositely directed tabs 56 of the apertured plate 36 engage the inwardly directed tabs 58 of the fixed apertured plate 34.

As best seen in FIG. 4, when the apertured plates 36, 38, and 40 have advanced outward of the lens and shutter assembly housing 6 as far as possible, the apertures 42 and 44 of the apertured plate 34 will be completely covered. At this time, the area of the front portion 22 of the foldaway cover assembly 16 outward of the apertured plate 34 will likewise be covered by the advanced apertured plates 40, 38, and 36.

In a similar manner, clockwise rotation of the focusing ring 68 and the profile cam 94 will cause the lever arm 70 to pivot counterclockwise about the pin assembly 72, causing the pin assembly 88 to simultaneously move upward in the slot 86 and carry the end portion 84 and the arm 80 across the inner front wall 8 in a direction way from the flashcube mounting assembly 12. Such movement of the arm 80 will cause the apertured plate 40 to advance in the opposite direction toward the flashcube mounting assembly 12.

As the apertured plate 40 is advanced toward the mounting assembly 12, the forwardly directed tab 64 will successively engage the edges of the apertures 42 and 44, of the apertures 38, 36, and 34, respectively, closest to the inner edge portions 46 until all of said apertured plates are positioned with their respective apertures 42 and 44 in registration in the fully opened position, as illustrated in FIG. 1.

For any particular setting of the focusing ring 68, and with a given trim adjustment as discussed more fully, infra, the apertured plates 34 – 40 will be relatively positioned so as to define a predetermined net aperture as a function of the cam 94.

Before proceeding further, it should be noted that the photographic camera 2 of the subject invention includes a shutter mechanism and a circuit for automatically controlling exposure duration in accordance with ambient scene brightness. This shutter mechanism, shown and described in detail in U.S. Pat. No. 3,522,765, issued on Aug. 4, 1970, to Bruce K. Johnson, et al., and commonly assigned herewith, generally comprises a first blade which is initially in covering position, relative to an aperture through which exposure is effected, and is moved to uncover the aperture to initiate exposure. A second blade is moved after the expiration of a time period, which is established by an exposure time circuit, to cover the aperture and terminate the exposure. The second blade is releasably retained in an open position by an electromagnet and the timing and exposure control circuit is designed to cut off the flow of current to the electromagnet to free the second blade from movement to its exposure terminating position.

Referring now to FIG. 7, the exposure control system of the subject invention is shown including an electronic timing network 146 such as is taught in U.S. Pat. Application, Ser. No. 104,822, filed Jan. 7, 1971, by Edwin H. Land, and commonly assigned herewith. Basically, the timing network includes a source of current in the form of a battery 148 supplying a potential $E_0$, through a normally open switch $S_1$, to a solenoid 150. The switch $S_1$ is designed to be moved to a closed position by movement of a conventional shutter release member such as the shutter release button 14 shown in FIGS. 1 and 3 which initiates exposure.

The circuit 146 includes a voltage-sensitive circuit having a normally non-conducting stage that includes a transistor $Q_1$ having base, collector, and emitter electrodes 152, 154, and 156, respectively. The collector electrode 154 of the transistor $Q_1$ is connected to a terminal 158 by a variable bias resistor 160 and the emitter electrode 156 of the transistor $Q_1$ is connected to a terminal 162 by a variable bias resistor 164.

The normally conducting stage of the circuit includes a transistor $Q_2$ having base, collector, and emitter electrodes 166, 168, and 170, respectively. The collector electrode 168 is connected to the terminal 158 so that the latter is energized when the transistor $Q_2$ conducts; the base electrode 166 of the transistor $Q_2$ is connected to the collector electrode 154 of the transistor $Q_1$ through a lead 172 and the emitter electrode 170 of the transistor $Q_2$ is connected through the bias resistor 164 to the terminal 162.

It should be noted that with this arrangement there is essentially a common emitter resistor; the adjustment of the resistor 164 being for the purpose of establishing a point at which it is desired to deenergize the circuit. While the two stages of the circuit may be characterized as "normally not conducting" and "normally conducting," it should be obvious that this characterization is applicable only when power is applied to the circuit.

The timing network of the circuit includes a photosensitive element 174, such as a cadmium sulfide photoconductor, arranged to receive light from a scene being photographed and having a resistance which is functionally related to the intensity of such light. The photosensitive element 174 is connected in series with an electrical impedance which, in the form shown, comprises a capacitor $C_1$. Thus, the timing network is connected between the terminals 158 and 162 to form a conventional integrating circuit having an input at the terminal 158 and an output at a terminal 176, the connection between the photosensitive element 174 and the capacitor $C_1$.

Connected between the output terminal 176, of the timing network 146, and the terminal 162 is a second switch $S_2$ which is normally in the closed position and may be opened by movement of a shutter element to initiate exposure. In the operation of the shutter, it is preferred that the switch $S_1$ be closed first to supply current to the solenoid 150 and that the switch $S_2$ be opened in synchronism, although not necessarily simultaneously, with the initiation of exposure.

The transistor $Q_2$ conducts almost instantaneously with the closing of the switch $S_1$ because at the instant of such closing, the collector-base junction of the transistor $Q_2$ is reverse-biased, causing leakage current to flow through the resistor 160 establishing a forward bias on the emitter-base junction. The setting of the variable resistor 160 establishes the degree to which the transistor $Q_2$ conducts so that the current through the solenoid 150 can be adjusted to provide magnetomotive force in the magnetic circuit to retain the shutter blade, which subsequently moves to terminate exposure, in its initial position. The flow of current through the resistors 160 and 164, when the transistor $Q_2$ conducts, establishes at the collector 154 and the emitter 156 of the transistor $Q_1$, bias voltages having first values dependent upon the magnitudes of the respective current and resistance values.

At the instant the switch $S_1$ is closed, and until the switch $S_2$ is opened, the potential at the terminal 176 will be at ground. It should be noted that the timing means acts as a conventional integrating circuit so that when the voltage is applied to the input terminal 158 by closing switch $S_1$, there appears the output terminal 176, upon opening of the switch $S_2$, a voltage which changes from an initial value, e.g., ground potential, to a preselected value during a period of time dependent upon the value of the capacitor $C_1$ and the resistance of the photosensitive element 174 as established by the intensity of the light incident thereon from the scene being photographed. When the voltage at the terminal 176 is at its initial value and the voltages at the collector 168 and the emitter 170 are at their first values of bias voltage, due to the conduction of the transistor $Q_2$, the collector-base and emitter-base junctions of the transistor $Q_1$ are reverse-biased, resulting in the transistor $Q_1$ being cut off or rendered non-conducting. When the voltage at the output terminal 176 reaches a preselected value which forward-biases the emitter-base junction of the transistor $Q_1$, the latter will begin to conduct.

It has been found that when using a photo-flash device such as the flashcube 10 of FIGS. 1 and 3, which provides a high-intensity light for a relatively short duration, it is usually necessary to synchronize the actuation of the flash lamp with the actuation of the camera shutter in order to effect an exposure utilizing the full output of the flash lamp. For this reason, it is common practice to provide a flash synchronizing circuit in the camera shutter for providing current to actuate the flash lamp by closing the switch in timed relation to the opening of the camera shutter to thereby initiate exposure in synchronism with the commencement of illumination by the lamp. Such a switch may be closed by movement of the shutter blade itself and, as shown in FIG. 7, a switch $S_3$ is illustrated connected in series with the battery 148 and a flash lamp, such as the lamp 10 of FIG. 1, for supplying power to the lamp when the switch is closed. It should be noted that although the circuit diagram indicates that the lamp 10 receives current from the battery 148, it is possible and, in fact, may be desirable to provide a separate power source for energizing the flash lamp.

The shutter of the camera of the subject invention is designed to respond to the intensity of the illumination received from the scene so that proper exposures are provided automatically even when the intensity of the scene illumination is changing while an exposure is being made. Thus, the exposure control circuit 146 reacts to terminate the exposure when the light energy incident on the photosensitive means 174 reaches a predetermined value. The photosensitive means 174 receives light from the entire scene being photographed and, as mentioned supra, functions in the nature of an integrator to exhibit a resistance which represents the average value of the scene illumination.

The exposure control circuit 146 is designed to automatically control the duration of exposure during "ambient" operation, whereas when a flash lamp is employed to illuminate the subject, it is desirable to provide for exposures of a predetermined duration and control the effective light output of the flash lamp in order to achieve the desired exposure. Accordingly, means are provided for switching the exposure control circuit from an automatic mode to making exposures of a predetermined duration. These means comprise a resistor 178 connected in parallel with the photosensitive means 174, between the terminals 176 and 158, and a single-throw, double-pole switch 180 for selectively connecting either the photosensitive means 174 or the resistor 178 in circuit between the terminals 176 and 158.

As previously noted, the exposure duration is a function of the resistance of the photosensitive means 174 and will be a function of the resistance of the resistor 178 when the latter is connected in circuit in place of the photosensitive means 174. It is apparent, therefore, that the position of the switch 180 determines the mode of operation of the exposure timing circuit and that the resistor 178 can be selected to provide an exposure of any predetermined duration such as, for example, 1/30 of a second, which is at least as long as the duration of most conventional oxidizable flash lamps.

Typically, the flashcube mounting assembly 12 of FIGS. 1 and 3, may be provided with means for automatically switching the exposure control circuit 146 to the "flash" mode of operation (via the switch 180) in response to introduction of the base of a flash-cube 10 thereinto in a well-known manner such as is taught in U.S. Pat. application, Ser. No. 104,822, previously mentioned herein.

As best seen in FIG. 6, the photosensitive element 174 is positioned within the lens and shutter assembly housing 6 behind an aperture 101 in the mirror front wall 8 so as to be able to receive illumination from the scene being photographed. A field lens 102 is secured within a hollow cylindrical control knob 104 which, in turn, is rotatably secured (extending through the aperture 101) to the inner front wall 8 of the lens and shutter assembly housing 6 via a support plate 106 in a well-known manner. The control knob 104 is so positioned that the field lens 102 will be located in front of the photosensitive means 174. The field lens 102 functions in a manner well known to the art, whereby illumination from that portion of the subject within the field of view of the lens assembly 66 will be transmitted to the photosensitive means so that the exposure interval may be controlled as a function of the brightness of the scene being photographed, as described supra.

The cylindrical control knob 104 extends toward the inner front wall 8 of the lens and shutter assembly housing 6 to a second profile cam 108 which is fixedly secured thereto so as to rotate coaxially therewith. The profile cam 108 is rotated by means of the cylindrical control knob 104 and is provided with a tab portion 110 extending radially outward from its peripheral surface and adapted to engage a stop 112 in the form of a lug projecting normally outward from the support plate 106 which functions to limit the clockwise travel of the profile cam 108. The periphery of the cam 108 rises abruptly to define a shoulder 114 which comes into abutment with the stop 112 to prevent or limit counterclockwise rotation of the profile cam 108.

It will be recalled that it was previously mentioned that the cam follower 96 includes an end portion 100 suitably configured to ride upon and follow the peripheral surface of the profile cam 94. Similarly, the cam follower 96 extends to an end portion 116, remote from said end portion 100, and configured to ride upon and follow the peripheral surface of the profile cam 108. Like the end portion 100, the end portion 115 is biased into engagement with the peripheral surface of its respective profile cam (the cam 108) by the spring 74 which biases the lever arm 70 in a counterclockwise direction, about the pin assembly 72 which, in turn, (as mentioned previously biases the cam follower 96 counterclockwise about said pin assembly 72 by virtue of its pivotal connection to the pin assembly 98 eccentric of the pin assembly 72.

As best seen in FIGS. 5 and 6, the cylindrical control knob 104 extends through the aperture 101 in the inner front wall 8 of the lens and shutter assembly housing 6 and terminates in a pinion 118 which is fixedly secured thereto, coaxially therewith. The pinion 118 is rotatably received within a cylindrical recess 120 in the rear face 122 of the inner front wall 8. The generally cylindrical recess 120 is of suitable shape so as not to completely cover the teeth 124 of the pinion 118, and said pinion 118 is provided with an opening centrally therethrough of sufficient diameter so as not to obstruct the field lens 102, as will appear hereinafter.

A variable density filter 126 (such as is common in the art) have a pair of spaced, parallel flanges 128 and 130, is slideably received between a pair of spaced, parallel ridges 132 on the rear face 122 of the inner front wall 8 so as to cover the field lens 102.

As best seen in FIG. 6, the variable density filter 126 is provided with a portion of least density 134, a central portion of variable density 136, and a portion of greatest density 138, with the density of the central portion 136 progressively increasing from the interface between the portion 136 and the portion 134 to the interface between the portion 136 and the portion 138. The inner face of the flange 130 is provided with a rack 140 adapted to engage the teeth 124 of the pinion 118 that are exposed by the generally cylindrical recess 120 in the rear surface 122. A generally rectangular spring member 142 is provided with a predetermined preload and is secured between the spaced, parallel ridges 132 by means of tab members 144 integral with and extending inwardly between the spaced, parallel ridges 132 whereby the spring member 142 may be disposed in overlying relationship with the variable density filter 126 so as to resiliently urge the latter toward the inner face 122 whilst permitting said filter 126 to slide over the field lens 102 between the spaced, parallel ridges 132. The spring member 142 is further provided with a tab 145 which cooperates with a recess 147 in one of said ridges 132 to properly register said spring member 142 with respect to said rear face 122.

Considering the operation of the novel trim mechanism hereindescribed in greater detail and with particular attention to operation of the photographic camera 2 in the "flash" mode, reference should again be made to FIGS. 1 and 3. For any particular position of the focusing ring 68 and the cam 94, the cam 108 may be actuated by the hollow cylindrical control knob 104 to vary the net aperture through which light from the flashcube 10 may be transmitted to a subject. For example, rotation of the control knob 104, and the second profile cam 108 therewith, will cause the cam follower 96 to pivot about the point of contact between the end portion 100 and the cam 94, thereby causing the lever arm 70 to pivot about the pin assembly 72 to actuate the arm 80 and, hence, the apertured plate 40.

Rotation of the control knob 104 and the second profile cam 108 clockwise will decrease the net aperture defined by the apertured plates 34 – 40 independent of the setting of the focusing ring 68 and the profile cam 94. Similarly, rotation of the control knob 104 and the profile cam 108 in the counterclockwise direction will increase the net aperture defined by said apertured plates 34 – 40 independent of the focus setting of the lens assembly 66 and the cam 94 operatively connected therewith.

It should be noted at this point that during operation of the photographic camera 2 in the "flash" mode, as aforesaid, the photosensitive element 174, positioned behind the field lens 102, is switched out of the exposure control circuit and replaced by the fixed resistor 178 (FIG. 7) in response to insertion of a flashcube 10 into the mounting assembly 12. Thus, the duration of the exposure is maintained constant and the illumination reaching the subject from the flashcube 10 and reflected back to the film plane of the camera 2 is solely a function of the range of the subject and the setting of the control knob 104 and its associated profile cam 108 to provide a desired trim.

Upon removal of the flashcube 10 from the mounting assembly 12, the photographic camera 2 will be automatically switched to the ambient mode of operation and the photosensitive element 174 will be switched into the exposure control circuit 146 in place of the fixed resistor 178 mentioned hereinabove. Although the trim adjustment made during the "flash" mode of operation of the photographic camera 2 (as described supra) will have effected a trim adjustment for the ambient mode of operation as well, it may be desired to otherwise alter the trim when converting from the "flash" mode to the ambient mode of operation.

Considering the novel trim feature herein described in more detail, it should be apparent that rotation of the hollow cylindrical control knob 104 will cause the pinion 118 to rotate therewith causing the variable density filter 126 to linearly traverse the rear face 122, between the spaced, parallel ridges 132, because of the interaction between the teeth 124 of the pinion 118 and the rack 140.

As previously described, it should be noted that the photosensitive element 174 is positioned rearward of the variable density filter 126 whereby light from a subject being photographed will be transmitted by the field lens 102 through the variable density filter 126 which will attenuate same prior to its reaching the photosensitive element.

It should now be apparent that by varying the rotational position of the cylindrical control knob 104, the portion of the variable density filter 126 disposed between the field lens 102 and the photosensitive element 174 will be altered to effect a variable preselected attenuation in the illumination reaching said photosensitive element 174.

Thus, with the various component portions of the novel trim system herein described, rotation of the hollow cylindrical control knob 104 in a clockwise direction will successively position the portions 138, 136, and 134 between the field lens 102 and the photosensitive element 174 to progressively decrease the attenuation of the illumination reaching said photosensitive element 174, whereby the exposure interval will be decreased during ambient operation.

In contradistinction, counterclockwise rotation of the control knob 104 will cause progressively increased attenuation of the illumination reaching the photosensitive means 174 and, hence, will effect an increase in the duration of exposure when operating in the ambient mode. Of course, the lightness of the finished photograph will be related directly to the duration of exposure and, hence, progressively increasing the duration of exposure will progressively lighten the photographic image reproduced of the subject and vice versa.

It will be recalled that clockwise rotation of the control knob 104 when operating in the "flash" mode progressively attenuated the illumination reaching the subject and, hence, reflected therefrom, to the film plane of the photographic camera 2, whereas counterclockwise rotation of the control knob 104 progressively increased the illumination transmitted to the subject and reflected therefrom to said film plane. Accordingly, it should be clear that a single adjustment of the control knob 104 (during either the "flash" or ambient mode of operation of the photographic camera 2) will provide a desired trim which is effective not only in the mode of operation in which the adjustment is made, but also one which is effective when the photographic camera is switched to the other of its two modes of operation.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is, therefore, to be understood that within the scope of the appended claims, the instant invention may be practised in a manner otherwise than is specifically described herein.

I claim:

1. In combination with a photographic exposure control system of the type responsive to at least two distinct parameters; means for selectively altering the response of said control system to changes in each of said parameters, including:
   a unitary control member;
   means operatively connected to said unitary control member for selectively attenuating the illumination effecting a photographic exposure independent of said parameters; and
   means operatively connected to said unitary control member for sensing a predetermined variable attenuated portion of the illumination available for effecting a photographic exposure of a subject and selectively altering exposure duration in response thereto.

2. The invention according to claim 1, further including aperture defining means and wherein said sensing means includes a variable density filter operably connected to said unitary control member and positioned in overlying relationship with said aperture defining means whereby the illumination reaching said aperture defining means from a photographic subject may be attenuated by a predetermined amount responsive to said unitary control member.

3. The invention as delineated in claim 2, wherein said exposure control system is operable in first and second modes and further including means for disabling said exposure duration altering means upon switching from said second mode to said first mode.

4. The invention as set forth in claim 3, wherein said unitary control means is operably connected to each of said means for selectively attenuating photographic exposure effecting illumination and said exposure duration altering means such that adjustment of said control means whilst said exposure duration altering means is operable will automatically effect adjustment of the attenuation of said photographic exposure effecting illumination upon switching to said first mode of operation.

5. The invention as described in claim 4, wherein said exposure system includes aperture adjusting means and further includes first cam means for selectively controlling said aperture adjusting means as a function of the range of a photographic subject and said exposure effecting illumination attenuating means includes means for selectively controlling said aperture adjusting means independent of said range.

6. The invention as recited in claim 5, wherein said exposure effecting illumination attenuating means includes second cam means and cam follower means operably connected to both said first and second cam means whereby adjustment of said second cam means will alter the response of said aperture adjusting means to said first cam means.

7. Apparatus as set out in claim 6, wherein said aperture adjusting means includes a housing and an array of apertured plates movably secured within said housing and cooperable to define a variable aperture for the passage of light.

8. The invention as set forth in claim 7, wherein said subject is artificially illuminated by a flash lamp or the like and said aperture adjusting means is operable to attenuate light from said flash lamp or the like reaching an exposure plane.

9. Trim means for use with an exposure control system for a camera of the type operating in a first mode as a function of camera-to-subject range and in a second mode as a function of subject illumination; said trim means including:
   unitary control means for selectively altering the response of said exposure control system to said range when operating in said first mode;
   means operably connected to said control means for selectively altering the response of said exposure control system to said illumination; and
   means for altering the response of said exposure control system in one mode of operation as a function of alterations made to the response of said exposure control system in a different mode of operation upon switching from said different mode of operation to said one mode of operation.

10. The invention as recited in claim 9, wherein said exposure control system functions in a first mode to vary the illumination of said subject as a function of the range thereof and in said second mode to vary the duration of exposure in response to the illumination from said subject.

11. The invention in accordance with claim 10, wherein said response altering means includes means for varying the illumination of said subject independent of the range thereof and means for varying the exposure duration independent of subject illumination.

12. The invention as delineated in claim 11, wherein said camera includes lamp means and said independent illumination varying means includes cam means operably connected to aperture control means for selectively defining an aperture for the passage of illumination from said lamp means to said subject.

13. The invention as set out in claim 12, wherein said independent exposure duration varying means includes variable attenuating means disposed in overlying relationship with photosensitive means for selectively attenuating illumination reaching said photosensitive means from said subject.

14. In combination with an exposure control system for a photographic camera having first and second modes of operation and responsive to at least one distinct parameter when operating in either of said modes, means for selectively altering the response of said control system to changes in said parameters, including:
   means for altering the response of said exposure control system to a first parameter when operating in said first mode;

means for altering the response of said exposure control system to a second parameter when operating in said second mode; and unitary control means for actuating said first and second mode response altering means.

15. The invention as described in claim 14, wherein said unitary control means is operably connected to each of said first and second mode response altering means such that adjustment of said first mode response altering means whilst said second mode response altering means is disabled will automatically effect adjustment of said second mode response altering means upon switching to said second mode of operation.

16. The invention in accordance with claim 15, wherein said exposure control apparatus includes aperture adjusting means effective in said first mode of operation and exposure duration limiting means effective in said second mode of operation.

17. The invention in accordance with claim 16, wherein said exposure control system further includes first cam means for selectively controlling said aperture adjusting means as a function of the range of the photographic subject and said first mode response altering means includes means for selectively controlling said aperture adjusting means independent of said subject range.

18. The invention as set forth in claim 17, wherein said first mode response altering means includes second cam means and cam follower means operably connected to both said first and second cam means whereby adjustment of said second cam means will alter the response of said aperture adjusting means to said first cam means.

19. The invention according to claim 18, wherein said aperture adjusting means includes a housing and an array of apertured plates movably secured within said housing and cooperable to define a variable aperture for the passage of light.

20. The invention as stated in claim 19, wherein said subject is artificially illuminated by a flash lamp or the like and said aperture adjusting means is operable to attenuate light from said flash lamp or the like reaching an exposure plane.

21. The invention as characterized in claim 20, wherein said second mode response altering means includes aperture defining means and a variable density filter operably connected to said unitary control means and positioned in overlying relationship with said aperture defining means, whereby illumination reaching said aperture defining means from said subject may be attenuated by a predetermined amount responsive to said unitary control member.

22. The invention of claim 21, wherein said second mode response altering means further includes means for sensing the illumination transmitted by said variable density filter and selectively controlling said exposure duration limiting means responsive thereto.

23. Apparatus according to claim 22, wherein said unitary control member includes an opening extending therethrough to define an aperture and further including a field lens disposed within said opening for transmitting to said sensing means illumination from said subject corresponding to the field of view of said camera.

24. Trim control apparatus for use with a camera of the type having support means; receiving means connected to said support means for securing a lamp to illuminate a subject; foldaway cover means disposed outward of said receiving means so as to define a window; an array of apertured plates movably secured within said cover means and cooperable to vary the size of said window; means actuable in accordance with camera-to-subject distance for moving at least one of said array of apertured plates and thereby selectively blocking portions of the illumination from said lamp by varying the size of said window; and exposure control apparatus incorporating photoresponsive means and shutter means whereby exposure duration is controlled via said photoresponsive means; said trim control apparatus including:

a unitary control member rotatably connected to said support means and having an opening therethrough;

a field lens disposed within said control member for transmitting illumination from said subject to said photoresponsive means;

cam means connected to said control member and rotatable therewith;

cam follower means operably connected to said cam means and said array of apertured plates for selectively advancing at least one of said apertured plates in response to rotation of said control member;

a pinion connected to said control member so as to be rotatable therewith;

a variable density filter slideably secured to said support means between said field lens and said photoresponsive means; and a rack disposed along a portion of said filter and in engagement with said pinion whereby rotation of said control member will cause said filter to traverse said support means over said field lens to selectively attenuate the illumination transmitted by said field lens and incident on said photoresponsive means.

25. A photographic exposure control system having a first exposure control mode for use with artificial light and a second exposure control mode for use with ambient light, said exposure control system including:

first means operable in said first mode for automatically determining an exposure parameter as a function of camera focus setting;

second means operable in said second mode for automatically determining an exposure parameter as a function of the level of ambient light; and unitary control means for adjusting said first and second means to alter the values of both of said exposure parameters determined thereby.

26. The system of claim 25, wherein said first means comprises means for determining an effective aperture operably disposed with respect to the artificial light.

27. The system of claim 26, wherein said aperture determining means is located to be disposed intermediate the source of such artificial light and the subject.

28. The system of claim 25, wherein said exposure control system is adapted to effect the exposure of a film unit to light from a subject and said second means is operable in said second mode to determine the effective time period during which light reflected by the subject is incident upon the film unit as a function of the level of ambient light.

29. The system of claim 28, wherein said first means comprises means for determining an effective aperture operably disposed with respect to the artificial light.

30. The system of claim 25, wherein said exposure parameter determined by said first means differs in type from said exposure parameter determined by said second means.

31. The system of claim 29, wherein said unitary control means is operably connected to said first and second means such that displacement of said control means whilst in said first exposure control mode will alter one of said parameters and will effect adjustment of said second means to alter the other of said parameters upon changing to said second exposure control mode.

32. An exposure control system for use with a focusable photographic camera, comprising:
  means for alternately defining a first exposure mode for use with artifical light and a second exposure mode for use with ambient light to control the amount of light incident upon a film unit in both said exposure modes, said mode defining means having an exposure parameter in said first mode operable over a first given range and an exposure parameter in said second mode operable over a second given range and including means for automatically setting an operating value within said first given range responsive to focus setting according to a first given factor and means for automatically setting an operating value within said second given range responsive to the level of ambient light according to a second given factor;
  a unitary control member; and
  means responsive to the actuation of said unitary control member for adjusting both of said first and second given factors.

33. A photographic system for use with a film unit, said system comprising:
  means for alternately defining a first exposure mode for use with artificial light and a second exposure mode for use with ambient light to control the amount of light incident upon the film unit in both said exposure modes, said mode defining means being normally responsive in said first exposure mode to the film unit-to-subject distance according to a first given factor for determining an effective aperture from an available range of effective apertures, said effective aperture being operably disposed with respect to the artificial light, and normally responsive in said second exposure mode to the level of ambient light according to a second given factor for determining the effective time period, from an available range of effective time periods, which light reflected by the subject is incident upon the film unit, said mode defining means including a timing circuit, a light sensitive element coupled to said timing circuit and light filtering means having a variable characteristic optically disposed intermediate the subject and said light sensitive element for facilitating the determination of said effective time period;
  a unitary control member; and
  means responsive to the actuation of said unitary control member for simultaneously adjusting both of said first and second given factors, said adjusting means including means for adjusting the effective filter characteristic of said light filtering means.

34. A photographic system for use with a film unit, said system comprising:
  means for alternately defining a first exposure mode for use with artificial light and a second exposure mode for use with ambient light to control the amount of light incident upon the film unit in both of said exposure modes, said mode defining means being operative at a particular value within an available range of values responsive to an operator input according to a first given factor in said first exposure mode and operative at a particular value within an available range of values responsive to an environmental condition according to a second given factor in said second exposure mode;
  a unitary control member; and
  means responsive to the actuation of said unitary control member for simultaneously adjusting both of said first and second given factors when in either of said exposure modes.

* * * * *